(12) United States Patent
Im et al.

(10) Patent No.: US 9,649,616 B2
(45) Date of Patent: May 16, 2017

(54) CONTINUOUS SOLID-STATE POLYMERISATION DEVICE AND METHOD

(71) Applicant: Samsung SDI Co., Ltd., Yongin-si (KR)

(72) Inventors: Sang Kyun Im, Uiwang-si (KR); Suk Min Jun, Uiwang-si (KR); Shin Hyo Bae, Uiwang-si (KR); So Young Kwon, Uiwang-si (KR); Eun Ju Lee, Uiwang-si (KR); Young Sub Jin, Uiwang-si (KR); Kyoung Kyun Park, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 0 days.

(21) Appl. No.: 14/899,203

(22) PCT Filed: Oct. 22, 2013

(86) PCT No.: PCT/KR2013/009436
§ 371 (c)(1),
(2) Date: Dec. 17, 2015

(87) PCT Pub. No.: WO2014/204055
PCT Pub. Date: Dec. 24, 2014

(65) Prior Publication Data
US 2016/0144337 A1    May 26, 2016

(30) Foreign Application Priority Data

Jun. 21, 2013 (KR) .................. 10-2013-0071895

(51) Int. Cl.
*C08F 2/00* (2006.01)
*B01J 19/18* (2006.01)
(Continued)

(52) U.S. Cl.
CPC ........... *B01J 19/28* (2013.01); *B01F 7/00466* (2013.01); *B01F 9/08* (2013.01); *B01F 13/06* (2013.01);
(Continued)

(58) Field of Classification Search
CPC ........ B01J 19/0066; B01J 19/18; B01J 19/28; B01J 19/0073; B01J 2219/00094;
(Continued)

(56) References Cited

U.S. PATENT DOCUMENTS 4,540,774 A    9/1985 Gerking et al.
5,599,507 A    2/1997 Shaw et al.
(Continued)

FOREIGN PATENT DOCUMENTS

JP    05-062544 A    8/1993
JP    10-087821 A    4/1998
(Continued)

OTHER PUBLICATIONS

Office Action in counterpart Korean Application No. 10-2013-0071895 dated Oct. 20, 2015, pp. 1-7.
(Continued)

*Primary Examiner* — William Cheung
(74) *Attorney, Agent, or Firm* — Additon, Higgins & Pendleton, P.A.

(57) ABSTRACT

The continuous solid-state polymerization device of the present invention comprises: a feeder for continuously introducing a prepolymer; a horizontal reactor which is connected via a first connecting part to the feeder and receives the prepolymer from the feeder so as to subject same to solid-state polymerization, wherein the reactor itself is rotated; a stirring device which comprises a stirring shaft rotating inside the horizontal reactor, in the direction opposite to that of the rotational axis of the horizontal reactor, and
(Continued)

comprises stirring blades joined vertically to the stirring shaft; and a chamber which is connected via a second connecting part to the horizontal reactor and, once the solid-state polymerization has been completed, receives the resulting polymer discharged from the horizontal reactor, and, here, the feeder, the horizontal reactor and the chamber are in a vacuum state. The continuous solid-state polymerization device prevents the formation of prepolymer stagnation zones, and allows solid-state polymerization to take place continuously in the vacuum state without any inert gas.

13 Claims, 2 Drawing Sheets

(51) Int. Cl.
| | |
|---|---|
| B01J 19/28 | (2006.01) |
| C08F 2/01 | (2006.01) |
| C08G 63/80 | (2006.01) |
| C08G 69/06 | (2006.01) |
| C08G 69/30 | (2006.01) |
| B01J 19/00 | (2006.01) |
| B01F 9/08 | (2006.01) |
| B01F 13/06 | (2006.01) |
| B01F 15/06 | (2006.01) |
| B01F 7/00 | (2006.01) |
| C08G 64/20 | (2006.01) |

(52) U.S. Cl.
CPC ......... *B01F 15/065* (2013.01); *B01J 19/0066* (2013.01); *B01J 19/0073* (2013.01); *B01J 19/18* (2013.01); *C08F 2/01* (2013.01); *C08G 63/80* (2013.01); *C08G 64/205* (2013.01); *C08G 69/06* (2013.01); *C08G 69/30* (2013.01); *B01F 2015/061* (2013.01); *B01F 2015/062* (2013.01); *B01F 2215/0431* (2013.01); *B01J 2219/00094* (2013.01); *B01J 2219/00159* (2013.01); *B01J 2219/00162* (2013.01); *B01J 2219/00166* (2013.01); *B01J 2219/00168* (2013.01); *B01J 2219/00186* (2013.01); *B01J 2219/00189* (2013.01); *B01J 2219/0204* (2013.01); *B01J 2219/182* (2013.01); *Y02P 20/149* (2015.11)

(58) Field of Classification Search
CPC .... B01J 2219/00159; B01J 2219/00162; B01J 2219/00166; B01J 2219/00168; B01J 2219/00186; B01J 2219/00189; B01J 2219/182; B01J 2219/0204; B01F 9/08; B01F 13/06; B01F 15/065; B01F 7/00466; B01F 2015/062; B01F 2015/0431; C08G 64/205; C08G 69/205; C08G 69/30; C08G 63/80; C08F 2/01; Y02P 20/149
USPC ............................................. 526/62; 422/136
See application file for complete search history.

(56) References Cited

U.S. PATENT DOCUMENTS

| | | | |
|---|---|---|---|
| 6,010,667 A | 1/2000 | Meyer et al. | |
| 6,265,525 B1 | 7/2001 | Kinoshita et al. | |
| 6,329,494 B1 | 12/2001 | Arai et al. | |
| 6,329,495 B2 | 12/2001 | Kinoshita et al. | |
| 6,350,848 B1 | 2/2002 | Kinoshita et al. | |
| 6,753,403 B2 | 6/2004 | Kinoshita et al. | |
| 6,852,827 B2 | 2/2005 | Yamane et al. | |
| 8,088,885 B2 | 1/2012 | Fellinger | |
| 2003/0198739 A1 | 10/2003 | Mager et al. | |
| 2005/0196627 A1 | 9/2005 | Mager et al. | |
| 2009/0111954 A1* | 4/2009 | Matsuo | B01F 7/00583 526/68 |
| 2015/0031850 A1 | 1/2015 | Christel | |
| 2016/0136611 A1 | 5/2016 | Im et al. | |

FOREIGN PATENT DOCUMENTS

| | | |
|---|---|---|
| JP | 2001-270940 A | 10/2001 |
| JP | 2002-220463 A | 8/2002 |
| JP | 2003-012791 A | 1/2003 |
| JP | 2005-522554 A | 7/2005 |
| KR | 10-1996-0016955 A | 1/1999 |
| KR | 10-2001-0023969 A | 3/2001 |
| KR | 10-2008-0024130 A | 3/2008 |
| WO | 98/23666 A1 | 6/1998 |
| WO | 2007/116416 A2 | 10/2007 |
| WO | 2014/204055 A1 | 12/2014 |
| WO | 2015/005539 A1 | 1/2015 |

OTHER PUBLICATIONS

International Search Report in counterpart International Application No. PCT/KR2013/009436, dated Mar. 26, 2014, pp. 1-4.
Vouyiouka, et al., "Solid state polymerization", Science Direct, Prog. Polym. Sci. 30 (2005) 10-37.
International Search Report in commonly owned International Application No. PCT/KR2013/010606 dated Jan. 28, 2014, pp. 1-4.
Office Action is commonly owned Korean Application No. 10-2013-0080829 dated Oct. 20, 2015, pp. 1-8.
Office Action in commonly owned U.S. Appl. No. 14/902,076 mailed Aug. 31, 2016, pp. 1-9.

\* cited by examiner

CONTINUOUS SOLID-STATE POLYMERISATION DEVICE AND METHOD

CROSS-REFERENCE TO RELATED APPLICATIONS

This application claims priority to and the benefit of International Application No. PCT/KR2013/009436, filed Oct. 22, 2013, which published as WO 2014/204055 on Dec. 24, 2014, and Korean Patent Application No. 10-2013-0071895, filed in the Korean Intellectual Property Office on Jun. 21, 2013, the entire disclosure of each of which is incorporated herein by reference.

TECHNICAL FIELD

The present invention relates to a continuous solid-state polymerization apparatus and method. More particularly, the present invention relates to a continuous solid-state polymerization apparatus and method which can prevent formation of a prepolymer stagnation zone and continuously perform solid-state polymerization under a vacuum without using an inert gas.

BACKGROUND ART

Recently, a thermally resistant polymer composition has been widely used in automotive parts, electric/electronic products, machine components, beverage containers, fibers, films, tire cords, and the like. Examples of such polymer may include aliphatic polyamide polymers, such as Nylon 66 and Nylon 6, aromatic polyamide polymers (high heat resistant nylon resins) such as Nylon 6T, Nylon 9T, Nylon 10T, and Nylon 12T, polyester resins, such as polyethylene terephthalate (PET) reins, and polycarbonate (PC) resins.

Typically, in order to enhance heat resistance and impact resistance of a polymer, it is necessary to increase intrinsic viscosity (IV) of the polymer. For example, as a method for obtaining a polymer having an intrinsic viscosity of about 0.5 dL/g or higher, condensation polymerization of molten resins, which is referred to as a melting process, can be performed.

However, in such a melting process, a product is subjected to high shear due to high viscosity of a polymer (particularly, crystalline polymer) during condensation polymerization and transfer thereof, which can cause breakdown of the product. To solve this problem, the polymer must be heated over its melting point during the melting process. Thus, particularly, condensation polymerization of high heat resistant resins having high melting point requires enormous energy and is thus uneconomical. In addition, since the polymer is likely to carbonize in a long-term operation, a large amount of carbonized contaminants can be contained in final products, and the products can suffer from discoloration and thus can be unsuitable for applications requiring high whiteness.

To overcome these problems, solid-state polymerization (SSP) is commonly used. Typical solid-state polymerization includes a process in which amorphous polymer chips, prepolymers, and the like are placed in a solid-state polymerization reactor and heated for several to tens of hours while supplying an inert gas into the reactor in a circulating manner.

As an inert gas, nitrogen heated to a temperature higher than or equal to glass transition temperature of the polymer and less than the melting point of the polymer, for example, from about 130° C. to about 250° C., is mainly used. When an active gas such as oxygen is present in a polymerization system, some products can suffer from discoloration such as serious yellowing or browning during polymerization at high temperature. For this reason, an inert gas is used in solid-state polymerization. In other words, by circulating an inert gas through a reactor, inflow of an active gas can be minimized, and reaction by-products such as water, aldehydes, glycol, and phenol can be discharged together with the inert gas. However, when the by-products are recirculated into the solid-state polymerization reactor, purity of the circulated inert gas can be gradually reduced, thereby causing discoloration of the polymer, reduction in reaction rate, or even reverse polymerization due to high concentration of the by-products. Thus, the by-products must be removed from the inert gas prior to reintroduction of the inert gas. As such, typical solid-state polymerization requires lots of energy and costs to remove by-products such as water from an inert gas flow and maintain purity of the inert gas, and is thus uneconomical.

Examples of a typical batch type solid-state polymerization apparatus include a stationary apparatus in which reaction proceeds while stirring with a rotary vane mounted on a top side of a vertical reactor, and a tumbler type apparatus in which prepolymers are introduced into a reactor, both upper and lower portions of which are conical, and the reactor is sealed, followed by performing reaction while rotating the entire body of the reactor under a vacuum (Japanese Patent Laid-open Publication No. 2001-270940A, and the like).

In addition, examples of a typical continuous solid-state polymerization apparatus include a hopper type apparatus (WO1998-023666, and the like) and a horizontal circular reactor type apparatus (Japanese Patent Laid-open Publication No. 10-87821, and the like). The hopper type apparatus includes a vertical reactor having a cylindrical upper portion and an inverse conical bottom portion, wherein prepolymers are introduced to the upper portion while introducing a heated inert gas in the vicinity of the inverse conical bottom portion, such that the final products (polymers) are discharged to the bottom and the inert gas containing impurities generated during reaction are discharged to the upper portion. The horizontal circular reactor type apparatus includes a transverse reactor having a screw or disk type stirring vane therein, wherein mixing is performed using the stirring vane while simultaneously introducing prepolymers and a heated inert gas through an inlet, such that products (polymers) are discharged towards an outlet opposite the inlet and the inert gas containing impurities is discharged upwards near the outlet of reactor.

A batch type reaction apparatus can maintain a thermal history of prepolymers in a relatively constant manner as compared with a continuous reaction apparatus, thereby obtaining a uniform intrinsic viscosity (IV), but has disadvantages of low output per batch lot, long cycle time, and huge energy loss due to continuous repetition of heating and cooling processes for reaction, all of which lead to increase in product costs.

A continuous reaction apparatus is relatively steady as compared with a batch type reaction system, has high output per lot due to short cycle time, allows mass production even with a small sized apparatus, and can thus provide low investment costs and low energy loss thereby reducing product costs. However, in the continuous reaction apparatus, in molding into end products, a cycle time required for molding into one product is increased due to a broader molecular weight distribution than the batch type reaction apparatus, which can lead to reduction in productivity. In addition, in the case of a transverse reactor having a fixed reactor body and a rotatable stirring vane, in solid-state polymerization, an empty space must be created between an end tip of the stirring vane and an inner wall of the reactor in order to avoid problems of thermal expansion of the apparatus. However, since a stagnation zone through which few or no polymer flows can be created in that space, carbonized contaminants or the like are likely to be generated, causing deterioration in product quality, and prepolymers are likely to be crushed, causing changes in grain size. In addition, the continuous reaction apparatus has difficulty in continuous supply/discharge under a vacuum, and thus commonly employs an inert gas. However, heating and cooling of the gas must be repeated, and a separate purification process is required to recover a pure inert gas, from which by-products are removed. Thus, the continuous reaction apparatus exhibits poor energy efficiency as compared with the rotatable batch type solid-state polymerization apparatus.

Therefore, there is a need for a continuous solid-state polymerization apparatus (reactor) which can prevent formation of a prepolymer stagnation zone and can perform reaction under a vacuum.

DISCLOSURE

Technical Problem

It is an object of the present invention to provide a continuous solid-state polymerization apparatus and method which can prevent formation of a prepolymer stagnation zone.

It is another object of the present invention to provide an economical continuous solid-state polymerization apparatus and method which can continuously perform solid-state polymerization under a vacuum without using an inert gas.

The above and other objects of the present invention can be accomplished by the present invention described below.

Technical Solution

One aspect of the present invention relates to a continuous solid-state polymerization apparatus. The continuous solid-state polymerization apparatus includes a feeder for continuously introducing prepolymers; a rotatable transverse reactor connected to the feeder via a first connector and receiving the prepolymers from the feeder to perform solid-state polymerization; a stirring device including a stirring shaft rotating in a direction opposite a rotational axis of the transverse reactor within the transverse reactor and a stirring vane vertically attached to the stirring shaft; and a chamber connected to the transverse reactor via a second connector and receiving and discharging solid-state polymerized polymers from the transverse reactor, wherein the transverse reactor has a release coating film formed on an inner wall thereof, and the feeder, the transverse reactor and the chamber are under a vacuum.

In one embodiment, the continuous solid-state polymerization apparatus may include a sealing member preventing leakage/inflow of gas and liquid from/into the first and second connectors.

In one embodiment, the sealing member may be a magnetic fluid seal.

In one embodiment, the stirring vane may be a disk type.

In one embodiment, a vacuum pump may be connected to the chamber.

In one embodiment, a vacuum pump may further be connected to the feeder.

In one embodiment, the transverse reactor may include a pre-heating zone, a main-heating zone, and a cooling zone.

In one embodiment, the continuous solid-state polymerization apparatus may further include: a first hopper receiving the prepolymers from outside and maintained at atmospheric pressure; and a second hopper connected to the first hopper and receiving the prepolymers from the first hopper under atmospheric pressure and transferring the prepolymers to the feeder under a vacuum.

In one embodiment, the continuous solid-state polymerization apparatus may further include a third hopper connected to the chamber and receiving the polymers from the chamber under a vacuum and discharging the polymers to the outside under atmospheric pressure.

In one embodiment, the prepolymer may have an intrinsic viscosity (IV) of about 0.09 dL/g to about 0.49 dL/g.

In one embodiment, the solid-state polymerized polymer may have an intrinsic viscosity (IV) of about 0.5 dL/g to about 1.5 dL/g.

Another aspect of the present invention relates to a solid-state polymerization method. The solid-state polymerization method uses the continuous solid-state polymerization apparatus, and includes: introducing the prepolymers into the feeder; solid-state polymerizing the introduced prepolymers in the transverse reactor; and discharging the solid-state polymerized polymers to the chamber, wherein the solid-state polymerization is performed while stirring by the transverse reactor and the stirring device, and the above steps are continuously performed.

In one embodiment, the solid-state polymerization may be performed under a pressure of about 0.1 torr to about 100 torr.

Advantageous Effects

The present invention provides an economical continuous solid-state polymerization apparatus and method which can prevent formation of a prepolymer stagnation zone and can continuously perform solid-state polymerization under a vacuum without using an inert gas.

BEST MODE

Hereinafter, embodiments of the present invention will be described in more detail.

Figure 1:
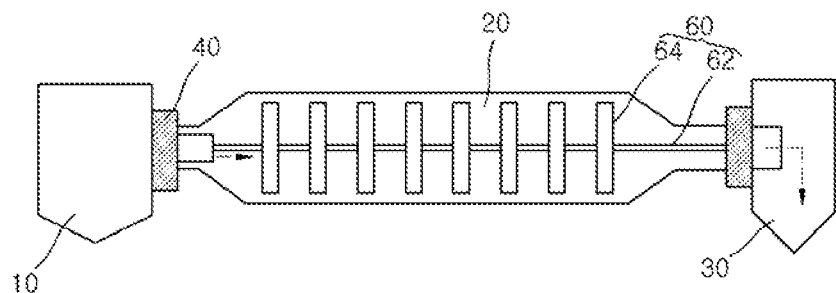
FIG. 1 is a schematic view of a continuous solid-state polymerization apparatus according to one embodiment of the present invention.

FIG. 1 is a schematic view of a continuous solid-state polymerization apparatus according to one embodiment of the present invention. As shown in FIG. 1, the continuous solid-state polymerization apparatus includes a feeder 10 for continuously introducing prepolymers; a rotatable transverse reactor 20 connected to the feeder 10 via a first connector and configured to receive the prepolymers from the feeder 10 to perform solid-state polymerization; a stirring device 60 including a stirring shaft (rod) 62 rotating in a direction opposite a rotational axis of the transverse reactor 20 within the transverse reactor 20 and a stirring vane 64 vertically attached to the stirring shaft 62; and a chamber 30 connected to the transverse reactor 20 via a second connector and configured to receive and discharge the solid-state polymerized polymers from the transverse reactor 20, wherein the transverse reactor 20 has a release coating film 28 formed on an inner wall thereof, and the feeder 10, the transverse reactor 20, and the chamber 30 are under a vacuum.

In one embodiment, the continuous solid-state polymerization apparatus may include sealing members 40 surrounding the first and second connectors to prevent leakage/inflow of gas and liquid from/into the first and second connectors to maintain a vacuum throughout the apparatus.

As used herein, a vacuum refers to a low or reduced pressure below atmospheric pressure (760 torr), for example, a pressure of about 0.1 torr to about 100 torr.

In the present invention, solid-state polymerization may be applied to resin products utilizing condensation polymerization without limitation. For example the continuous solid-state polymerization apparatus and method according to the invention may be applied to aliphatic polyamide polymers such as Nylon 46, Nylon 66, Nylon 6, and Nylon 6,10 and copolymers thereof; aromatic polyamide polymers such as Nylon 6T, Nylon 9T, Nylon 10T, and Nylon 12T and copolymers thereof (high heat resistant nylon resins); copolymers of aromatic polyamides and aliphatic polyamides, such as Nylon 6T/66 and Nylon 6T/46/66; polyester resins such as polyethylene terephthalate (PET) resins; and polycarbonate (PC) resins, without being limited thereto.

In addition, although generally performed using a prepolymer, solid-state polymerization may also be used as a method which allows a polymer already having a high molecular weight (intrinsic viscosity) to have even higher molecular weight so as to exhibit improved thermal resistance.

In the present invention, the prepolymer may take the form of a wet cake in which a lower order polymer having a low bulk specific gravity (for example, about 0.3 to about 0.5) and having various forms such as powder, chips, and particles and various sizes (for example, from about 30 μm to about 3 mm), without being limited thereto, contains about 1% by weight (wt %) to about 30 wt % of water or an organic solvent. Here, the lower order polymer is obtained by a process in which a solution-phase prepolymer having been subjected to typical pre-polymerization is placed under high pressure, followed by abruptly removing the pressure (a flash process). For example, as the prepolymer, a polymer having an intrinsic viscosity (IV) of about 0.09 dL/g to about 0.49 dL/g as measured at 25° C. using an Ubbelohde viscometer after dissolution in a sulfuric acid solution may be used. Preferably, the prepolymer has an intrinsic viscosity of about 0.11 dL/g to about 0.15 dL/g. Within this range, in solid-state polymerization, adhesion of the prepolymer to the inner wall of the reactor can be reduced.

As the feeder 10, a typical feeder capable of continuously supplying prepolymers into the continuous solid-state polymerization reactor may be used. As used herein, "the feeder" may mean a hopper, a chamber, and the like, which are connected to the feeder, as well as the feeder itself. As the feeder, a loss-in-weight type fixed quantity feeder (screw feeder, and the like) and a volumetric feeder may be used, without being limited thereto.

In one embodiment, the screw feeder may perform continuous supply in a manner that allows automatic control of rpm of a screw to maintain a desired feed value input to a controller.

The transverse reactor 20 has an inner space which is connected at an inlet thereof to the feeder via the first connector and receives prepolymers from the feeder to perform solid-state polymerization, wherein the reactor is rotatable about a horizontal axis thereof such that a polymer stagnation zone can be eliminated. As the transverse reactor 20, a rotary kiln dryer type reactor may be used, for example, which is provided at an inner wall thereof with a flight having various shapes such as a flat shape, a hook shape, or an elbow shape at 60° to 120° and various heights (for example, about 10 mm to about 800 mm). The flight allows the polymers at a bottom of the reactor to move towards an upper portion of a packed layer to be continuously mixed. Depending upon scale of the reactor, the number of flights may range from 2 to 16, specifically 6 to 12. For example, a flight having an elbow shape at about 90° may be disposed from the inlet of the transverse reactor 20 to a portion ahead of a middle portion to carry the polymers upwards as far as possible, and design for an angle of the elbow type flight may be modified, as needed.

In one embodiment, the transverse reactor 20 may have a diameter (inner diameter) of about 15 cm to about 240 cm and a length of about 2 m to 20 m, without being limited thereto.

In one embodiment, the transverse reactor 20 may be tilted such that the polymers can flow towards an outlet by gravity flow and rotation of the reactor. The tilting angle may range, for example, from about 0.05° to about 3.0°, specifically from about 0.2° to about 1.0° such that the inlet of the reactor is located above the outlet of the reactor.

Depending upon scale of the reactor, required residence time of the polymers, and the like, the rotation speed (tip speed) of the transverse reactor 20 may range, for example, from about 0.03 m/sec to about 0.6 m/sec, specifically from about 0.06 m/sec to about 0.3 m/sec. Within this range, it is possible to reduce or prevent formation of a polymer stagnation zone.

In the transverse reactor 20, depending upon scale of the reactor, required residence time of the polymers, and the like, the introduction rate of the prepolymers may range from about 0.1 kg/hr to about 1,500 kg/hr.

The stirring device 60 includes a stirring shaft (rod) 62 rotating in a direction opposite a rotational axis of the transverse reactor 20 within the transverse reactor 20 and a stirring vane 64 vertically attached to the stirring shaft 62, and performs stirring to prevent formation of stagnant zones of the prepolymers and the polymers and acts as a dam capable of controlling movement of the prepolymers and the polymers to prevent the prepolymers and the polymers from moving towards the outlet too fast.

Figure 3:
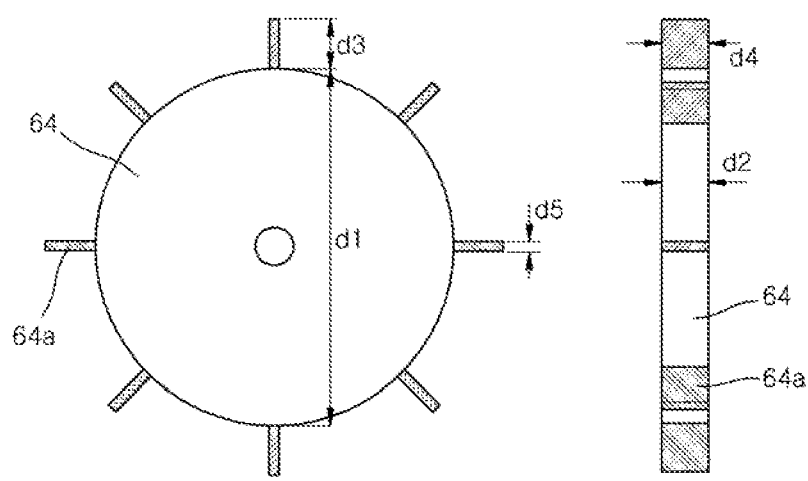
FIG. 3 is a schematic view of a stirring vane used in Examples 1 to 3 according to the present invention.

In one embodiment, the stirring vane 64 may have a disk shape and may be provided at a plane and/or a tip perpendicular to a rotational axis the disk with a vane 64a (see FIG. 3) having a similar size and shape to the flight (not shown) of the reactor 20, thereby providing enhanced mixing (stirring) effects. Depending upon scale of the transverse reactor 20, required residence time of polymers, and the like, the number of stirring vanes 64 may range from 2 to 16, specifically 6 to 12. Depending upon scale of the transverse reactor 20, the stirring vane may have a diameter d1 of about 10 cm to about 230 cm and a thickness d2 of about 1 cm to about 20 cm. The vane 64a may be 2 to 16-plate type vanes having a length d3 of about 10 mm to about 50 mm, a width d4 of about 20 mm to about 60 mm, and a thickness d5 of about 5 mm to about 20 mm, without being limited thereto (see FIG. 3).

Depending upon scale of the reactor, required residence time of polymers, and the like, the rotation speed (tip speed) of the stirring vane 64 may range from about 0.03 m/sec to about 0.6 m/sec, specifically about 0.06 m/sec to about 0.3 m/sec. Within this range, it is possible to reduce or prevent formation of a polymer stagnation zone.

In one embodiment, the stirring device 60 is provided therein with a jacket through which heating media (hot oil) circulate, which provides increase in heating area and allows the polymers to undergo additional heat exchange in a short period of time due to rotation of the stirring device in the direction opposite the reactor within the transverse reactor, thereby providing effective heating and maintenance of temperature.

The chamber 30 is connected to the outlet of the transverse reactor 20 via the second connector and configured to collect the solid-state polymerized polymers from the transverse reactor 20 and to discharge the polymers, and may be any discharge chamber typically used for solid-state polymerization reactors. For example, the chamber may be a chamber which can be maintained in a vacuum using a vacuum pump.

The sealing member 40 seals the first and second connectors through which the rotatable transverse reactor 20 is connected to the fixed feeder 10 and the chamber 30, respectively, to maintain the feeder 10, the transverse reactor 20, and the chamber 30 in a vacuum and to minimize air inflow.

In one embodiment, the sealing member 40 may be a magnetic fluid seal. The magnetic fluid seal is a device which induces magnetic power to be produced between a static magnet and a rotator rotating at the center thereof, whereby, upon introduction of a magnetic fluid (ferrofluid), the magnetic fluid forms a film, like an O-ring, between a pole piece and a rotational axis, thereby providing sealing. Such a magnetic fluid seal is a non-contact type seal, and thus causes little or no friction in rotation. Preferably, the sealing member is a high vacuum seal (magnetic fluid seal) capable of maintaining a vacuum of up to about $10^{-7}$ torr.

In one embodiment, the feeder 10, the transverse reactor 20, and the chamber 30 may have a maximum allowable vacuum leakage of up to about 0.7 torr liter/sec, as measured after processes wherein, with the entire interconnected system including the feeder 10, the transverse reactor 20, and the chamber 30 emptied before initiation of reaction, the system is evacuated to about 1 torr using a vacuum pump, followed by being left for about 1 hour subsequent to closing a suction valve of the vacuum pump.

Figure 2:
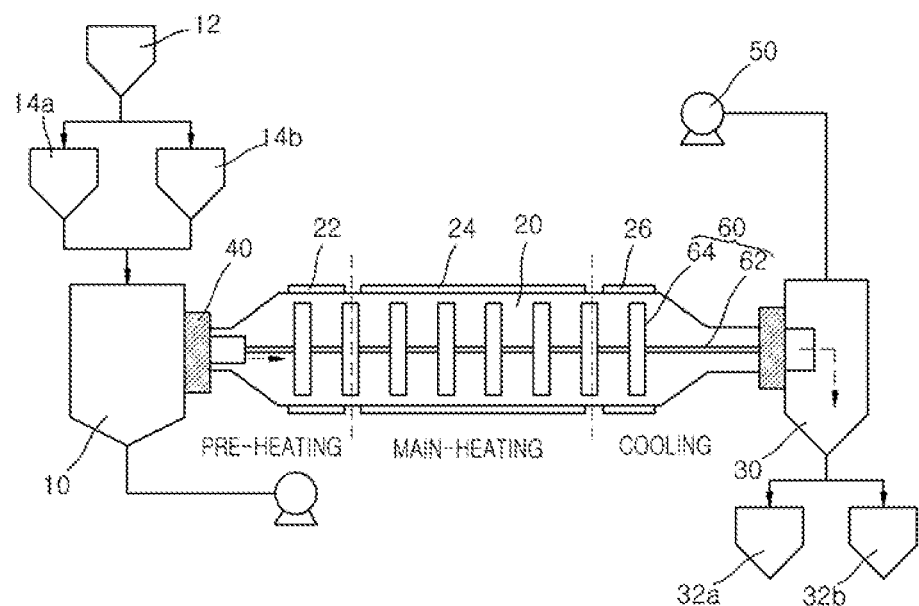
FIG. 2 is a schematic view of a continuous solid-state polymerization apparatus according to another embodiment of the present invention.

FIG. 2 is a schematic view of a continuous solid-state polymerization apparatus according to another embodiment of the present invention. As shown in FIG. 2, in the continuous solid-state polymerization apparatus according to this embodiment, a vacuum pump 50 may be connected to the chamber 30, or to both the feeder 10 and the chamber 30.

The vacuum pump 50 maintains the feeder 10, the transverse reactor 20, and the chamber 30 in a vacuum and discharges by-products, such as gasified unreacted monomers, oligomers, and vapor to the outside. The vacuum pump 50 may include any typical vacuum pump, for example, a dry vacuum pump, a water-to-air vacuum pump, an oil vane-type vacuum pump, and the like. In addition, depending upon a required vacuum, a vacuum ejector, a vacuum booster, and the like may be connected to a front end of the vacuum pump 50. For example, the vacuum pump 50 may be connected to a rear end of one or two vacuum ejectors, one or two vacuum boosters, and the like, which are connected in series.

In one embodiment, vapor or the like may be compressed to be cooled and partially condensed by the vacuum booster, and then introduced into the final vacuum pump and discharged therethrough. More particularly, the vapor or the like discharged from the transverse reactor 20 is passed through a cyclone device or the like to a vacuum pipe. After solid products discharged together with the vapor are initially filtered out, the resulting pure vapor is cooled using a cooler, such as a jacket piping gas cooler (duplex cooler), and is compressed to be cooled and partially condensed during passage through a one- or two-stage vacuum booster, and then introduced to the final vacuum pump 50 to be discharged therethrough. The vapor or the like discharged through an outlet of the vacuum pump 50 may be entirely recovered using a condenser with coolants, a scrubber, and the like.

As shown in FIG. 2, the transverse reactor 20 may include a pre-heating section, a main-heating section, and a cooling section. Although these sections may be included in different apparatuses, respectively, the present invention allows pre-heating, main heating, and cooling to be performed in a single reactor, thereby facilitating maintenance of a vacuum.

In one embodiment, although the range of each section may vary depending upon the kind of polymer, scale of the reactor, and the like, the pre-heating section may extend over about ½ of the total length of the reactor from the inlet of the transverse reactor; the main-heating section may extend over about ⅔ of the total length of the reactor following the pre-heating section; the cooling section may be a discharging portion which extends over about ½ of the total length of the reactor following the main-heating section.

Each of these sections may be formed by disposing a jacket in which heating media, coolants, and the like circulate, and a circulator (temperature control system), such as inner coils on the outer and inner walls of the reactor, and the like. For example, the pre-heating section may be formed by placing a circulator 22 for pre-heating at a portion corresponding to the pre-heating section (including the reactor 20 and the feeder 10) and circulating heating media (hot oil) having a temperature of about 210° C. or less, preferably from about 150° C. to about 210° C., through the circulator. In addition, the main-heating section may be formed by placing a circulator 24 for main-heating at a portion corresponding to the main-heating section and circulating heating media (hot oil) having a temperature of about 200° C. to about 300° C., preferably from about 210° C. to about 260° C., through the circulator 34. Here, the temperature of hot media used in the circulator 22 for pre-heating and the circulator 24 for main-heating may vary depending upon the kind of polymer to be solid-state polymerized.

Further, the cooling section may be formed by placing a circulator 26 for cooling at a portion corresponding to the cooling section and spraying air at room temperature through a spray nozzle of the circulator 26 for cooling or circulating refrigerants such as coolants through the circulator. In the cooling section, the reactor 20 may be provided on the inner wall thereof with a grid type dumping flight which allows cooled polymers to easily move towards the outlet.

As shown in FIG. 2, the continuous solid-state polymerization apparatus may further include a first hopper 12 receiving the prepolymers from outside and maintained at atmospheric pressure; and one or more, preferably at least two second hoppers 14a, 14b connected to the first hopper 12 and configured to receive the prepolymers from the first hopper 12 under atmospheric pressure and to transfer the prepolymers to the feeder 10 under a vacuum. The second hopper 14a, 14b may selectively receive the prepolymers based on a residual amount of the prepolymers. When two or more hoppers are alternately operated, continuous feeding is possible. For example, the internal pressure of the second hopper 14a, 14b, may be changed from a vacuum to atmospheric pressure by closing a pipe for supplying the prepolymers and opening an upper vent, or may be changed from atmospheric pressure to a vacuum by closing a pipe for receiving the prepolymers from the first hopper 12 and discharging a gas to the vacuum pump 50. Thus, when two or more second hoppers 14a, 14b are used, one second hopper 14a or 14b may supply the prepolymers to the feeder 10 under a vacuum, and another second hopper 14a or 14b may receive the prepolymers from the first hopper 12 under atmospheric pressure to be on stand-by to instantly supply the prepolymers to the feeder 10 under a vacuum in place of the one second hopper when few or no prepolymers remain in the one second hopper 14a or 14b. By repeating such a process, it is possible to continuously introduce the prepolymers without influencing a vacuum of the transverse reactor 20.

In addition, the continuous solid-state polymerization apparatus may further include third hoppers 32a, 32b connected to the chamber 30 and configured to receive solid-state polymerized polymers from the chamber 30 and to discharge the polymers to the outside under atmospheric pressure. The third hoppers 32a, 32b are capable of changing an internal pressure thereof into a vacuum or atmospheric pressure in the same manner as in the second hoppers 14a, 14b, and may receive solid-state polymerized polymers under a vacuum from the chamber 30, which must be maintained at a vacuum, and discharge the polymers under atmospheric pressure subsequent to disconnection from the chamber without affecting a vacuum of the reactor.

In one embodiment, the solid-state polymerized polymer may have an intrinsic viscosity (IV) of about 0.5 dL/g to about 1.5 dL/g, without being limited thereto.

A continuous solid-state polymerization method according to the present invention is a solid-state polymerization method using the continuous solid-state polymerization apparatus as set forth above, and includes: introducing prepolymers into the feeder 10; solid-state polymerizing the introduced prepolymers in the transverse reactor 20; and discharging the solid-state polymerized polymers to the chamber 30, wherein the above steps are continuously performed.

The prepolymers may be introduced into the feeder 10 through the first and second hoppers 12, 14a, 14b, and the solid-state polymerized polymers may be transferred from the chamber 30 to the third hoppers 32a, 32b, and then discharged to the outside.

The solid-state polymerization may be performed through the pre-heating section, main heating section, and cooling section of the transverse reactor 20.

In one embodiment, solid-state polymerization may be performed under a pressure of about 0.1 torr to about 100 torr, specifically about 3 torr to about 50 torr. Within this range, the solid-state polymerized polymer products can have excellent whiteness without using an inert gas.

The solid-state polymerization method is continuously performed under a vacuum without using an inert gas, and thus allows costs for recovering/recycling the inert gas to be saved while preventing quality deterioration due to an active gas.

Mode for Invention

Next, the present invention will be described in more detail with reference to some examples. It should be understood that these examples are provided for illustration only and are not to be construed in any way as limiting the invention.

In addition, descriptions of details apparent to those skilled in the art will be omitted for clarity.

EXAMPLES

Example 1

As the transverse reactor 20 of FIGS. 1 and 2, a cylindrical transverse rotary kiln reactor having an inner diameter of 600 mm and an axial length of 7,000 mm was used. The reactor was tilted at an angle of 0.2° such that an inlet was located above an outlet thereof. In the transverse reactor 20, as the stirring device 60, a stirring device including a stirring shaft 62 rotating in a direction opposite the transverse reactor 20 and eight disk type stirring vanes 64 vertically attached to the stirring shaft 62, each having a diameter d1 of 500 mm and a thickness d2 of 40 mm and arranged at an interval of 600 mm was used. Each of the stirring vanes 64 was provided at a tip thereof with eight plate type vanes (length d3: 30 mm, width d4: 40 mm. thickness d5: 10 mm) (see FIG. 3). As a prepolymer, a wet cake having a mixed bulk specific gravity of 0.33 in which a lower order polymer of a particulate polyamide resin having an average particle diameter of 0.7 mm and an intrinsic viscosity (IV) of 0.2 dL/g contained 5 wt % of water. The prepolymer was continuously supplied to the transverse reactor 20 at a constant rate of 10 kg/hr using a screw feeder, as the feeder 10, through which heating media at 80° C. circulate via a jacket (not shown) disposed on an outer wall of the feeder 10. In the reactor 20, a pre-heating section (length: 1,500 mm) was formed by circulating heating media at a constant temperature of 170° C. through a jacket 22 for pre-heating disposed on an outer wall of the reactor 20, and a main-heating section (length: 4,000 mm) was formed by circulating heating media at 245° C. through a jacket 24 for main-heating. Polymers had an average residence time of 4.5 hours to 5.0 hours in the pre-heating section and the main-heating section, and were then continuously moved to a cooling section (length: 1,500 mm) formed by a jacket 26 for cooling. Here, the reactor was maintained in a vacuum using a vacuum pump system 50 in which a vacuum booster was placed ahead of a water-to-air vacuum pump to maintain a vacuum of about 5 torr. In addition, in the cooling section, the outer wall of the reactor 20 and the polymers within the reactor were cooled by a process in which the jacket 26 for cooling including a hollow-type circular air supply chamber was disposed in a space at a predetermined distance from the outer wall of the reactor 20 and air at room temperature introduced from outside was sprayed onto a surface of the outer wall of the reactor 20 through the chamber. The reactor 20 had a rotation speed (tip speed) of 0.19 m/sec (6 RPM).

Example 2

As the transverse reactor 20 of FIGS. 1 and 2, a cylindrical transverse rotary kiln reactor having an inner diameter of 600 mm and an axial length of 7,000 mm was used. The reactor was tilted at an angle of 0.2° such that an inlet was located above an outlet thereof. In the transverse reactor 20, as the stirring device 60, a stirring device including a stirring shaft 62 rotating in a direction opposite the transverse reactor 20 and eight disk type stirring vanes 64 vertically attached to the stirring shaft 62, each having a diameter d1 of 500 mm and a thickness d2 of 40 mm, and arranged at an interval of 600 mm was used. Each of the stirring vanes 64 was provided at a tip thereof with eight plate type vanes (length d3: 30 mm, width d4: 40 mm. thickness d5: 10 mm) (see FIG. 3). As a prepolymer, a powder having an average particle diameter of 1.0 mm was used. Here, the powder was obtained by dissolving a lower order polymer of a polycarbonate resin having an intrinsic viscosity (IV) of 0.23 dL/g to a predetermined concentration in chloroform and then crystalizing the dissolved polymer using an acetone/methanol-mixed non-solvent. The prepolymer was continuously supplied to the transverse reactor at a constant rate of 10 kg/hr using a screw feeder, as the feeder 10, through which heating media at 80° C. circulate via a jacket (not shown) disposed on an outer wall of the feeder 10. In the reactor 20, a pre-heating section (length: 1,500 mm) was formed by circulating heating media at a constant temperature of 200° C. through a jacket 22 for pre-heating disposed at the outer wall of the reactor 20, and a main-heating section (length: 4,000 mm) was formed by circulating heating media at 240° C. through a jacket 24 for main-heating. Polymers had an average residence time of 4.5 hours to 5.0 hours in the pre-heating section and the main-heating section, and were then continuously moved to a cooling section (length: 1,500 mm) formed by a jacket 26 for cooling. Here, the reactor was maintained in a vacuum using a vacuum pump system 50 in which a vacuum booster was placed ahead of a water-to-air vacuum pump to maintain a vacuum of about 5 torr. In addition, in the cooling section, the outer wall of the reactor and the polymers within the reactor were cooled by a process in which the jacket 26 for cooling including a hollow-type circular air supply chamber was disposed in a space at a predetermined distance from the outer wall of the reactor 20 and air at room temperature introduced from outside was sprayed onto a surface of the outer wall of the reactor 20 through the chamber. The reactor 20 had a rotation speed (tip speed) of 0.19 m/sec (6 RPM).

Example 3

As the transverse reactor 20 of FIGS. 1 and 2, a cylindrical transverse rotary kiln reactor having an inner diameter of 600 mm and an axial length of 7,000 mm was used. The reactor was tilted at an angle of 0.2° such that an inlet was located above an outlet thereof. In the transverse reactor 20, as the stirring device 60, a stirring device including a stirring shaft 62 rotating in a direction opposite the transverse reactor 20 and eight disk type stirring vanes 64 vertically attached to the stirring shaft 62, having a diameter d1 of 500 mm and a thickness d2 of 40 mm, and arranged at intervals of 600 mm was used. Each of the stirring vanes 64 was provided at a tip thereof with eight plate type vanes (length d3: 30 mm, width d4: 40 mm. thickness d5: 10 mm) (see FIG. 3). As a prepolymer, a lower order polymer of a particulate polyethylene terephthalate resin having an average particle diameter of 2 mm and an intrinsic viscosity (IV) of 0.30 dL/g was used. The prepolymer was continuously supplied to the transverse reactor at a constant rate of 10 kg/hr using a screw feeder, as the feeder 10, through which heating media at 80° C. circulate via a jacket (not shown) disposed on an outer wall of the feeder 10. In the reactor 20, a pre-heating section (length: 1,500 mm) was formed by circulating heating media at a constant temperature of 220° C. through a jacket 22 for pre-heating disposed at the outer wall of the reactor 20, and a main-heating section (length: 4,000 mm) was formed by circulating heating media at 260° C. through a jacket 24 for main-heating. Polymers had an average residence time of 4.5 hours to 5.0 hours in the pre-heating section and main-heating section, and were then continuously moved to a cooling section (length: 1,500 mm) formed by a jacket 26 for cooling. Here, the reactor was maintained in a vacuum using a vacuum pump system 50 in which a vacuum booster was placed ahead of a water-to-air vacuum pump to maintain a vacuum of about 5 torr. In addition, in the cooling section, the outer wall of the reactor and the polymers within the reactor were cooled by a process in which the jacket 26 for cooling including a hollow-type circular air supply chamber was disposed in a space at a predetermined distance from the outer wall of the reactor 20 and air at room temperature introduced from outside was sprayed onto a surface of the outer wall of the reactor 20 through the chamber. The reactor had a rotation speed (tip speed) of 0.19 msec (6 RPM).

Experimental Example

The solid-state polymerized polyamide was measured as to intrinsic viscosity, color, and whiteness, and, after reaction, adhesion of polymers to the inner wall of the reactor was confirmed. Results are shown in Table 1.

Property Evaluation Method (1) Evaluation of adhesion: A surface of the reactor was subjected to air blowing at a pressure of 3 kg/cm$^2$G, followed by observing a surface state with the naked eye.

⊚: Little or no adhesion (although a small amount of polymers adhered to the surface before air blowing, the adhered polymers could be removed by air.)

○: Although a small amount of polymers still adhered to the surface after air blowing, the adhered polymers could be removed by hand.

Δ: Polymers still adhered to the surface after air blowing, and the adhered polymers could be removed by applying physical force using a tool.

x: Polymers still adhered to the surface after air blowing, and the adhered polymers were not easily removed even by applying physical force using a tool, and were removed by cleaning with a solvent.

(2) Measurement of intrinsic viscosity (IV): The polyamide was dissolved in sulfuric acid (98%), followed by measurement at 25° C. using an Ubbelohde viscometer.

(3) Measurement of color and whiteness: Three samples were collected for each example and placed in a sample holder for solid specimens, and, for each sample, color (SCI) (whiteness: L) and yellowness (b*) were measured five times, i.e. 15 times in total, using a CM-2600d spectrophotometer by Konica Minolta Co. Ltd., followed by calculating the average.

(4) Measurement of number average molecular weight (Mn), weight average molecular weight (Mw), and Polydispersity (PDI): GPC (Gel Permeation Chromatography) was used in measurement.

TABLE 1

|  | Example 1 | Example 2 | Example 3 |
|---|---|---|---|
| Intrinsic viscosity (dL/g) | 1.01 | 0.91 | 0.9 |
| Mn (g/mol) | 10,100 | 12,200 | 12,000 |
| Mw (g/mol) | 30,300 | 24,400 | 21,600 |

TABLE 1-continued

|  | Example 1 | Example 2 | Example 3 |
|---|---|---|---|
| PDI | 3 | 2 | 1.8 |
| Whiteness (L) | 95 | 97 | 95 |
| Yellowness (b*) | 4.49 | 3.72 | 2.83 |
| Adhesion | ○ | ○ | ○ |

From the results shown in Table 1, it could be seen that, in solid-state polymerization of polymers using the continuous solid-state polymerization apparatus according to the present invention, it was possible to economically manufacture a polymer having an intrinsic viscosity of 0.8 dL/g to 1.2 dL/g, which is a commercially meaningful level, and exhibiting no deterioration in whiteness and yellowness without using an inert gas.

It should be understood that various modifications, changes, alterations, and equivalent embodiments can be made by those skilled in the art without departing from the spirit and scope of the present invention.

The invention claimed is:

1. A continuous solid-state polymerization apparatus comprising:
    a feeder for continuously introducing prepolymers;
    a rotatable transverse reactor connected to the feeder via a first connector and receiving the prepolymers from the feeder to perform solid-state polymerization;
    a stirring device including a stirring shaft rotating in a direction opposite a rotational axis of the transverse reactor within the transverse reactor and a stirring vane vertically attached to the stirring shaft; and
    a chamber connected to the transverse reactor via a second connector and receiving and discharging solid-state polymerized polymers from the transverse reactor,
    wherein the transverse reactor has a release coating film formed on an inner wall thereof, and the feeder, the transverse reactor and the chamber are under a vacuum.

2. The continuous solid-state polymerization apparatus according to claim 1, comprising: a sealing member preventing leakage/inflow of gas and liquid from/into the first and second connectors.

3. The continuous solid-state polymerization apparatus according to claim 2, wherein the sealing member is a magnetic fluid seal.

4. The continuous solid-state polymerization apparatus according to claim 1, wherein the stirring vane is a disk type.

5. The continuous solid-state polymerization apparatus according to claim 1, wherein a vacuum pump is connected to the chamber.

6. The continuous solid-state polymerization apparatus according to claim 1, wherein a vacuum pump is further connected to the feeder.

7. The continuous solid-state polymerization apparatus according to claim 1, wherein the transverse reactor comprises a pre-heating zone, a main-heating zone, and a cooling zone.

8. The continuous solid-state polymerization apparatus according to claim 1, further comprising:
    a first hopper receiving the prepolymers from outside and maintained at atmospheric pressure; and
    a second hopper connected to the first hopper and receiving the prepolymers from the first hopper under atmospheric pressure and transferring the prepolymers to the feeder under a vacuum.

9. The continuous solid-state polymerization apparatus according to claim 1, further comprising:
    a third hopper connected to the chamber and receiving the polymers from the chamber under a vacuum and discharging the polymers outside under atmospheric pressure.

10. The continuous solid-state polymerization apparatus according to claim 1, wherein the prepolymer is a polymer having an intrinsic viscosity (IV) of about 0.09 dL/g to about 0.49 dL/g.

11. The continuous solid-state polymerization apparatus according to claim 1, the solid-state polymerized polymer has an intrinsic viscosity (IV) of about 0.5 dL/g to about 1.5 dL/g.

12. A solid-state polymerization method using the continuous solid-state polymerization apparatus according to claim 1, the method comprising:
    introducing the prepolymers into the feeder;
    solid-state polymerizing the introduced prepolymers in the transverse reactor; and
    discharging the solid-state polymerized polymers to the chamber,
    wherein the solid-state polymerization is performed while stirring by the transverse reactor and the stirring device, and the above steps are continuously performed.

13. The solid-state polymerization method according to claim 12, wherein the solid-state polymerization is performed under a pressure of about 0.1 torr to about 100 torr.

* * * * *